United States Patent [19]

Shelley et al.

[11] 4,119,853
[45] Oct. 10, 1978

[54] MULTICELL X-RAY DETECTOR

[75] Inventors: Peter Stephen Shelley, Brookfield; William Darrell Love; Barry Newell Stone, both of Waukesha, all of Wis.

[73] Assignee: General Electric Company, Schenectady, N.Y.

[21] Appl. No.: 804,980

[22] Filed: Jun. 9, 1977

[51] Int. Cl.² ...................... H01J 39/28; G01N 21/52
[52] U.S. Cl. ................................. 250/385; 250/445 T
[58] Field of Search .............. 250/385, 445 T; 313/93; 361/294, 303

[56] References Cited

U.S. PATENT DOCUMENTS 4,031,396   6/1977   Whetten et al. ...................... 250/385

*Primary Examiner*—Alfred E. Smith
*Assistant Examiner*—Janice A. Howell
*Attorney, Agent, or Firm*—Ralph G. Hohenfeldt

[57] ABSTRACT

A detector for X-radiation or other ionizing radiation comprises a pair of curved metal bars lying in spaced apart parallel planes. Ceramic members are bonded to the respective bars in facing relationship. Each ceramic member has a plurality of radially extending circumferentially spaced grooves facing similar grooves in the other member. A plurality of electrode plates are held in juxtaposed and circumferentially spaced apart relationship by disposing their respective upper and lower edges in the grooves of opposed ceramic members. The faces of adjacent electrode plates define gas-filled gaps in which photoelectron-ion pairs are produced when radiation enters from the front edges of the plates. The above described assembly is disposed within a pressurized gas-filled chamber having an X-ray transmissive window adjacent the front edges of the plates. A cover encloses the chamber. It has insulator feed-throughs for connecting the electrode plates with external electric circuits. Photoelectrons and/or ions, created by the ionizing radiation, are collected on the electrode plates and thereby generate an electrical signal which corresponds to the incident ionizing radiation.

30 Claims, 10 Drawing Figures

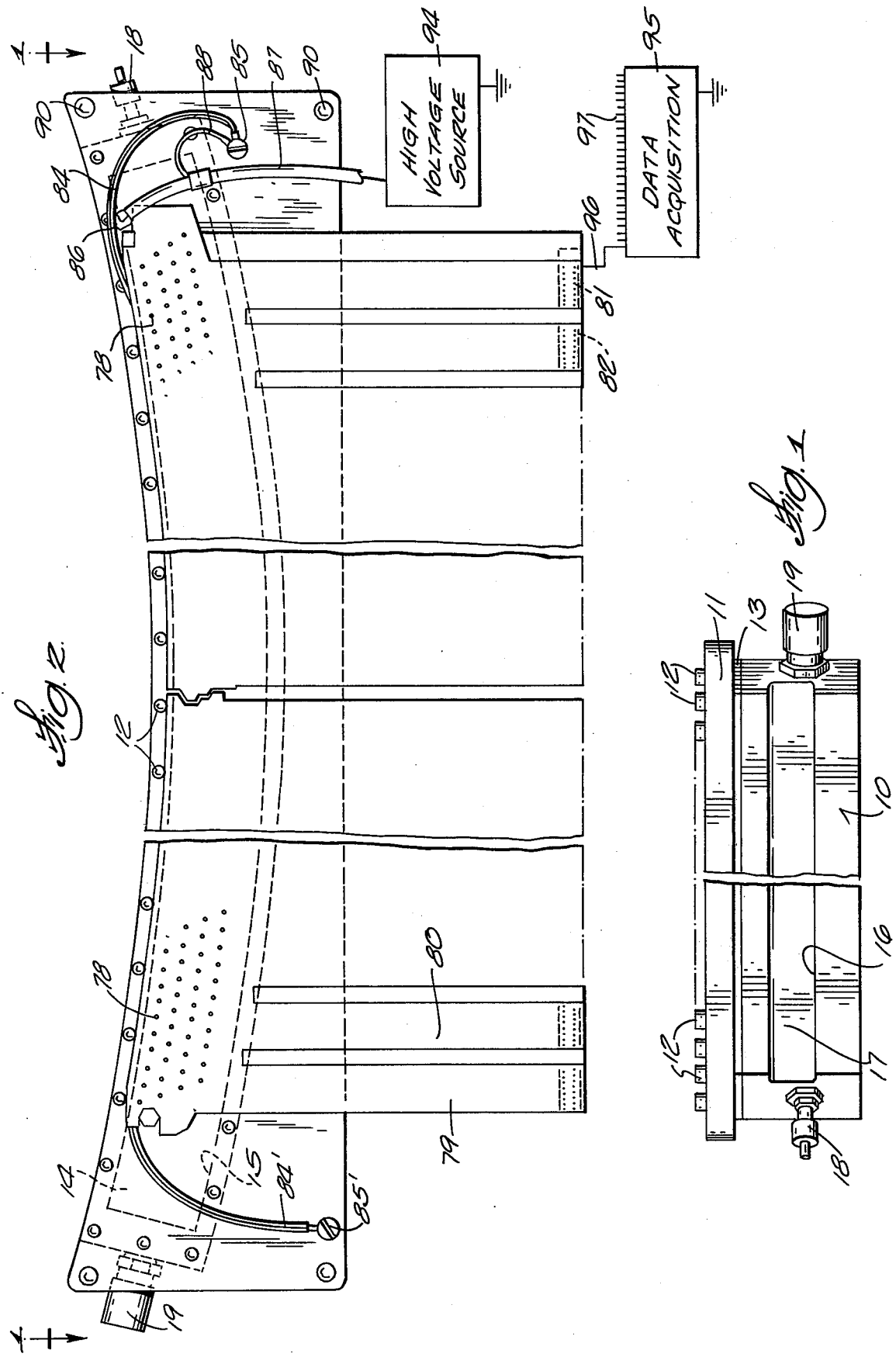

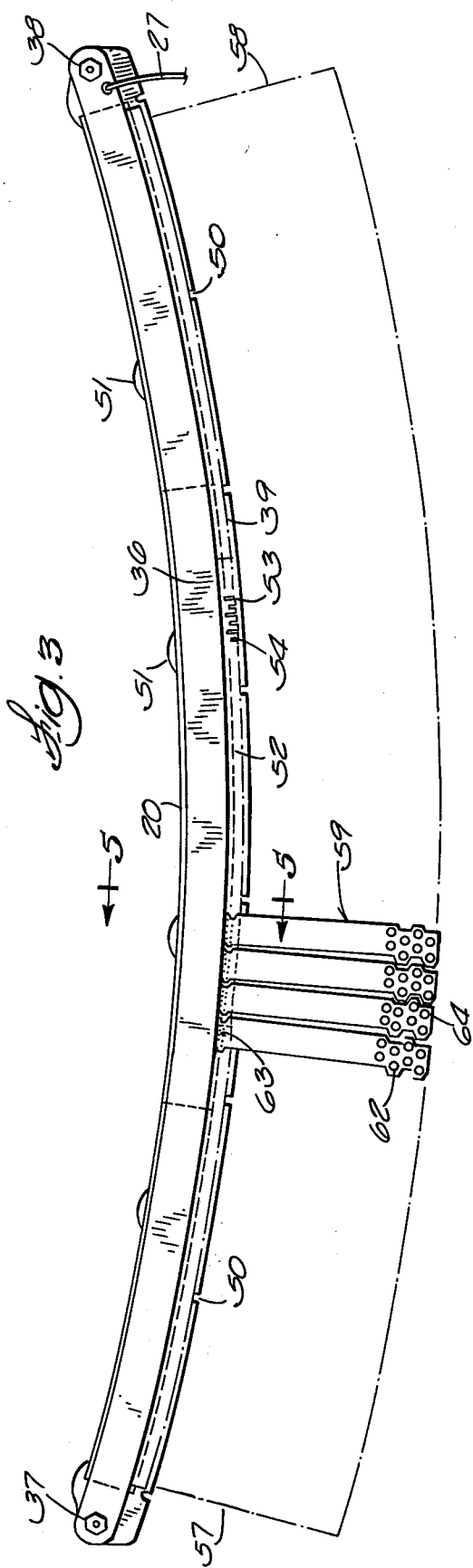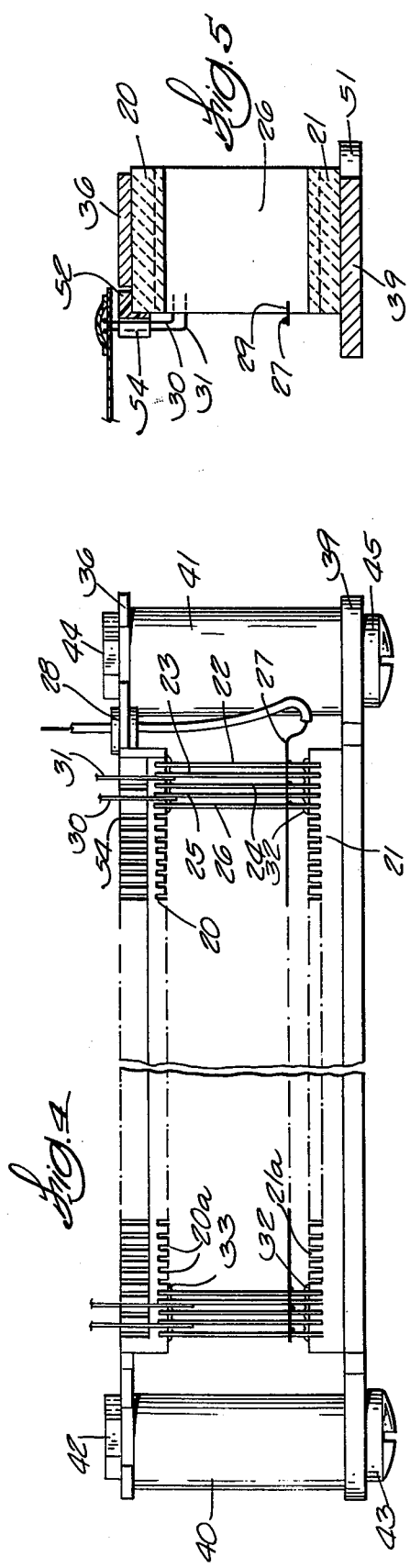

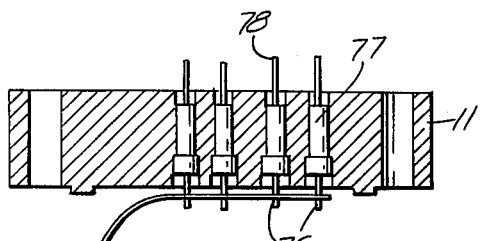
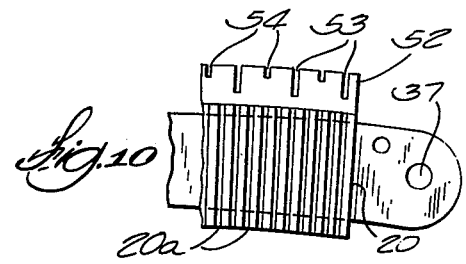
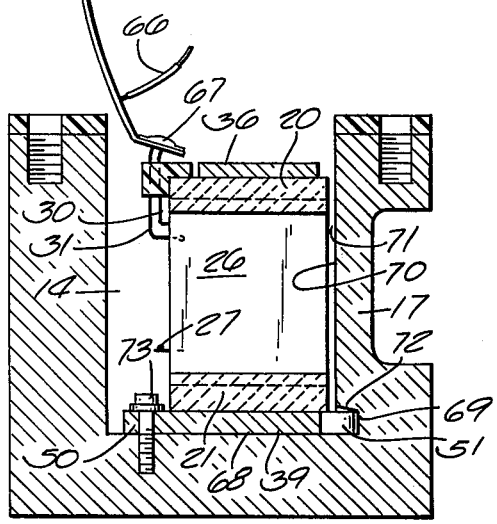
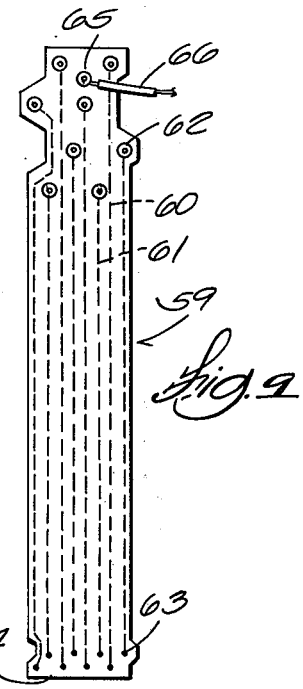
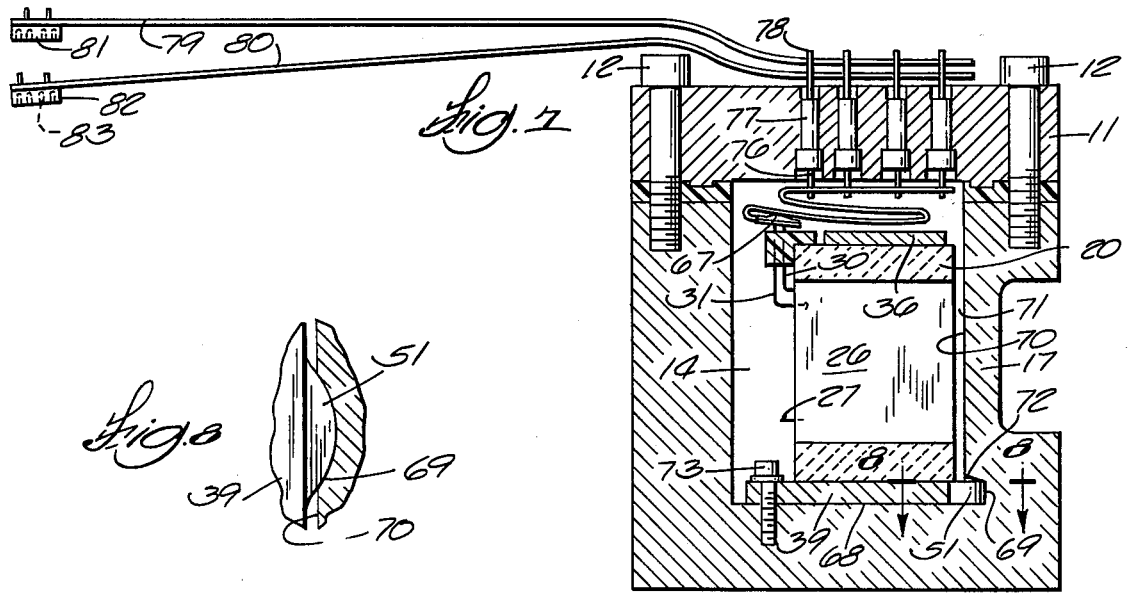

MULTICELL X-RAY DETECTOR

BACKGROUND OF THE INVENTION

This invention relates to detectors of ionizing radiation such as X-ray and gamma radiation. The invention is concerned with improving multicell detectors which have various uses but are especially useful in X-ray computerized axial tomography systems.

In the computerized axial tomography process, a spatial distribution of X-ray photon intensities emerging from a body under examination are translated into analog electric signals which are processed in a manner that enables reconstructing the X-ray image and displaying it as a visible image. Background information on the process is given in an article by Gordon et al, "Image Reconstruction from Projections", Scientific American, October 1975, Vol. 233, No. 4.

Detectors used in computerized axial tomography must detect X-ray photons efficiently and with a high degree of spatial resolution. In some systems, the X-ray source is pulsed and the pulse repetition rate can be limited by the recovery time of the X-ray detectors. It is desirable, therefore, to use X-ray detectors which have fast recovery time, high sensitivity, and fine spatial resolution. In multicell detectors, it is also important for each cell to have identical and stable detecting characteristics.

In some tomography systems, the X-ray beam is fan-shaped and diverges as it exits from the examination subject whereupon the beam falls on the array of detector cells such that photon intensities over the leading front of the beam can be detected and resolved spatially. As the X-ray source and detector orbit around the examination subject jointly, the X-ray intensities across the diverging beam projected from the source are detected by the individual detector cells and corresponding analog electric signals are produced. The individual detector cells are arranged in a stack or array so that the X-ray photons distributed across the beam at any instant are detected simultaneously. The signals correspond with X-ray absorption along each ray path at the instant of detection. Additional sets of signals are obtained for the several angular positions of the orbiting detector and X-ray source. The discrete analog signals are converted to digital signals and processed in a computer which is controlled by a suitable algorithm to produce signals representative of the absorption by each small volume element in the examination subject through which the fan-shaped X-ray beam passes.

To get good spatial resolution, it is desirable to have the electrode plates which comprise each cell spaced closely and uniformly over the entire length of the detector. A detector in which advanced achievement of these results is disclosed in copending application Ser. No. 727,260, filed Sept. 27, 1976, now U.S. Pat. No. 4,075,527. This patent is assigned to the assignee of the present application. The detector in the cited application comprises a plurality of adjacent but slightly spaced apart electrode plates standing edgewise so as to define gas-filled gaps between them in which ionizing events, that is, the production of electron-ion pairs due to photon interaction with the gas, may take place. The plates are established at a uniform distance from each other by applying a heat curable viscous resin between them and between their insulator spacers as the plates are being stacked in a clamping die. The die squeezes the plates toward each other, and the resin yields to let the plates assume a uniform distance from each other. The assembly remains in the die during the heat curing process which effects solidification and bonding to mantain the plates at a fixed spacing. Although the dimensional tolerance of the spaces or gaps between the plates is good, it is still not as precise as experience has shown is necessary to get the high precision X-ray intensity data that is required for a reconstructed image of the highest resolution and definition.

Besides having the problems of dimensional tolerance, stability and difficult assembly, there is a problem of microphonics in arrays of parallel plate electrodes fabricated as described above. These electrodes must be made of thin metal and must operate in close proximity with a relatively large potential difference between them. Mechanical vibrations transmitted to the plates may, therefore, significantly vary the capacitance between electrodes and, thus, introduce microphonic current changes which are detected in the current sensing electronics and may cause errors in the X-ray intensity measurements. These spurious currents, which are in the picoampere range but, nevertheless, significant compared to the X-ray induced signal, have been measured in prior art detectors when they have voltage applied even though no X-ray photons were present.

SUMMARY OF THE INVENTION

Basically, the ionizing radiation detector herein described comprises a chamber in which many discrete detector cells are arranged or stacked adjacent each other. Each cell comprises a pair of juxtaposed and circumferentially spaced apart parallel plates diverging along individual radii in the illustrated embodiment. Adjacent plates are at opposite polarities. The chamber is filled with high atomic weight ionizable gas at high pressure. X-ray photons, which penetrate a window in the chamber, interact with the gas to produce photoelectron-ion pairs in the cells in the presence of an electric field which is produced by the potential difference between adjacent plates. The electrons and positive ions resulting from interaction of the X-ray photons with the gas drift along electric field lines and are collected on the relatively positive and negative electrodes, respectively. The resulting analog electric current signals are proportional to the X-ray photon intensity between the electrode plates which comprise a cell. The electron-ion pairs must be collected and removed from the detector before the next X-ray exposure in order to produce unambiguous data.

In general terms, a preferred embodiment of the new multicell X-ray detector comprises a pair of flat metal bars which are curved in their planes and constitute a segment of a circle. The bars are disposed substantially congruently with each other in spaced apart parallel planes. There are spacers between the ends of the bars to maintain their spacing. Similarly curved insulating members which support electrodes are bonded to the facing sides of the respective bars. The insulating members have circumferentially spaced radially extending grooves machined in them. Grooves in opposite members lie on the same radii. The upper and lower edges of an array of electrode plates are inserted in corresponding grooves in the respective insulating members.

Alternate electrode plates are connected together and then connected to a common potential source. These are called the bias electrodes. The signal electrodes, constituting the electrode plates intervening between every other bias electrode plate, have their own individual connections leading to a data signal acquisition system which is exterior of the detector.

The above outlined assembly is disposed within a pressure vessel or chamber which has an internal channel that is curved complementarily with the electrode assembly. The assembly is anchored in the bottom of the channel by screwing down the lower curved bar. The lower bar has feet extending from it which register in slots in a wall of the chamber so as to maintain the front edges of all of the electrode plates at a constant distance from the front wall of the chamber. The front wall has a relatively thin section constituting an X-ray transmissive window. A cover is secured to the chamber to close the open topped channel and a sealing gasket is disposed between the cover and chamber. The cover has insulated feed-throughs for making electric connections to the electrode plates. Means are provided for pressurizing the interior of the chamber with a high atomic weight gas such as xenon at about 25 atmospheres to adapt the detector for use with X-rays having photon energies in the range up to 120 kiloelectron volts.

General objects of the invention are to provide a multicell X-ray detector comprised of cells defined by juxtaposed plates wherein the dimensions between the plates and, hence, the gas volume between the plates is maintained constant to a high level of precision so as to optimize detection uniformity and resolution.

Another object is to provide a multicell detector that does not exhibit substantial spurious signal currents due to microphonics. A correlative of this object being to make the detector substantially invulnerable to vibrations.

Other objects are to provide a multicell detector of highly simplified construction and which requires a minimum of skill to assemble and maintain.

Still another object of the invention is to provide a detector which is comprised of a comparatively low number of parts.

Yet another important object is to provide a detector which maintains its specified characteristics despite substantial thermal variations.

Other general objects are to provide a multicell X-ray detector: which is especially suitable for use in high speed computerized axial tomography systems; which is characterized by high sensitivity so as to permit reduced radiation dosage to the examination subject or patient; which has high resolving ability and stability that permits obtaining of accurate and reproducible data.

How the foregoing and other more specific objects of the invention are achieved will be evident in the ensuing description of an illustrative embodiment of the invention in which reference to the drawings will be made.

DESCRIPTION OF THE DRAWINGS

FIG. 1 is a front elevation view, taken in the direction of the arrows 1—1 in FIG. 2, of an assembled multicell detector which incorporates the features of the invention;

FIG. 2 is a plan view of the detector assembly with a flexible printed circuit connector assembly, which is not shown in the preceding figure, attached;

FIG. 3 is a plan view of the multicell electrode assembly before it is inserted in its gas-filled pressure chamber;

FIG. 4 is a rear elevation view of the assembly in the preceding figure;

FIG. 5 is a vertical section taken generally along the lines 5—5 in FIG. 3;

FIG. 6 is a section taken through the detector before the cover is clamped onto the detector chamber;

FIG. 7 is a transverse section taken through the assembled detector;

FIG. 8 is a fragmentary section taken along the lines corresponding substantially with 8—8 in FIG. 7.

FIG. 9 is a plan view of one of the flexible printed circuit connectors that is used internally of the detector assembly; and FIG. 10 is a fragmentary plan view of a ceramic electrode plate supporting member showing its radial grooves in and showing a slotted strip which has an L-shaped cross section on one edge thereof for bringing the fine electrode lead wires from the signal electrodes outwardly to the connectors, the ceramic member being shown as bonded to a curved metallic supporting bar.

DESCRIPTION OF A PREFERRED EMBODIMENT

FIG. 1 is a front elevation of the new multicell detector as it appears before its external electric leads are connected. The width of the detector is usually about the same as the width of the X-ray beam whose differential photon intensities are to be detected. The detector may be used in any physical orientation.

In FIG. 1, the detector comprises a body or chamber 10 and a cover 11. The cover is secured to the body with a plurality of socket headed cap screws 12. A gasket 13 is disposed between cover 11 and chamber 10. In a commercial embodiment, chamber 10 is a single piece of aluminum in which a curved channel is machined. In FIG. 2, the curved channel is marked 14 and its outline is shown by the dashed line marked 15. The curved front wall of chamber 10 has an elongated recess 16 milled in it. This provides a relatively thin front wall section 17 that serves as an X-ray permeable window which is thin enough to absorb little of the higher energy photons at the energies used in computerized tomography, but the window is thick enough to resist the high gas pressure which exists in the chamber.

A fitting 18, essentially a valve, is fitted into one end of chamber 10 for enabling the interior of the chamber to be evacuated and for filling it with ionizable gas. Pressure gage 19 is secured in another end of chamber 10. This is a known type of gage which enables measuring gas pressure in the chamber at any time by using electric conductivity indicating means.

Attention is now invited to FIG. 4 which shows a rear elevation of the detector assembly before it is installed in the pressure vessel or chamber 10. The assembly comprises an upper member 20 of a suitable insulating material which in this embodiment is a curved bar of ceramic. There is also a similarly curved lower ceramic member 21. Each of the ceramic members has radial slots milled in it as will be described in more detail later. A plurality of juxtaposed, circumferentially spaced apart and radially directed electrode plates have their upper and lower edges disposed in radially disposed grooves 20a and 21a in the upper and lower ceramic members 20 and 21, respectively. As can be seen in FIG. 4, the end bias electrode plate 22 and every alternate electrode plate, such as 24 and 26, are connected together by a common wire 27 which is insulated and passes through a bushing 28. The electrode plates which are connected in common have a high bias voltage applied to them during operation and are called the bias electrodes. As can be seen in FIG. 5, to enable connecting the common wire 27 to the bias electrodes such as 22, 24, 26 all across the array of electrodes, each of the bias electrodes has a small wire 29 spot welded to it and extending rearwardly. All of the wires 29 have common wire 27 or ribbon spot welded to them. This can be done easily since the spot welding operation is carried out before the assembly shown in FIG. 4 is installed in pressure chamber 10.

Further to FIG. 4, it will be noted that the bias electrode plates alternate with signal electrode plates, two of which are marked 23 and 25. Since discrete electric current signals are taken from each of the signal electrode plates, each of these electrodes has its own lead wire spot welded to it. Two illustrative lead wires are marked 30 and 31 in FIG. 4. Referring to FIG. 5 for a typical example, the signal electrode lead wires, such as 30 and 31, are seen to be spot welded to each signal electrode which is separated by a bias electrode such as 26.

Before the electrode plates are pushed into the open ended grooves 20a and 21a in the ceramic members 20 and 21, a viscous resin coating, such as an epoxy resin, is spread over the grooved face of each ceramic member 20 and 21. This assures an epoxy interface and, hence, a tight fit between the upper and lower edges of the electrode plates and the walls of the slots, and it also results in bridges of epoxy being developed between the electrode plates as indicated by the reference numerals 32 and 33 in FIG. 4. When the resin hardens, it contributes toward making the electrodes invulnerable to vibrations and, hence, relatively immune to microphonic or spurious noise signals as mentioned earlier.

The thin signal and bias electrode plates are preferably made of stiff high atomic number metal having high X-ray absorption, thus avoiding permeation of X-radiation from one gas-filled cell to another, called "cross talk", which degrades spatial resolution in the detector. In accordance with the invention, the plate metal is matched with other materials having appropriate thermal coefficients of expansion to avoid uneven expansion and distortion that might result from temperature changes as will be explained more fully later. Typical of the illustrated embodiment, enough plates are used to create 320 ionization cells which comprise the gas-filled spaces bounded by adjacent pairs of electrodes comprising a signal electrode and a bias electrode. In one commercialized design, the electrode plates are tungsten 6 mils (0.006 inch) thick. Since they are set in radial or diverging grooves in ceramic members 20 and 21, their front edges at the X-ray entry ends of the cells are separated by 36 mils and their rear edges by 37 mils. Of course, by milling narrower grooves 20a and 21a in the ceramic members 20 and 21, more grooves for thinner plates can be fitted into a given length of the ceramic members and more individual cells can be created over a given length. Increasing the number of active ionization cells results, within limits, in increased capability of the detector to resolve discrete X-ray absorption information which results ultimately in higher resolution and definition in the visual image that is produced by computerized image reconstruction. Use of 4 mil thick electrode plates is held in view, and it is expected that about 50% more cells than with the above given dimensions can be created. Tungsten, tantalum or alloys of tantalum and tungsten are desirable metals for the electrode plates because of their stiffness and high atomic numbers, but other high atomic number metals may also be used.

A fragment of the grooved upper ceramic member 20, which is typical, is shown in FIG. 10. It is a curved member that may be machined from a rectangular piece of ceramic bar stock. Member 20, as is the case with member 21, has the plurality of radial grooves 20a coextensive with the length of its inner face, or bottom face, as it is disposed in FIG. 4. Upper ceramic member 20 has one of its faces, which is opposite of its grooved face, bonded by means of a suitable adhesive, such as epoxy resin, to a curved metal mounting bar 36, a fragment of which is shown in FIG. 10. Bar 36 is preferably made of a stainless steel in the 416 series for various reasons including enabling thermal matching of the detector parts with the particular ceramic elements chosen. Other material combinations are possible. Curved bar 36 has a mounting hole 37 in one of its ends and a corresponding hole 38 in its other end. A plan view of the entire upper curved bar 36 may be seen in FIG. 3, and it appears in section in FIGS. 6 and 7.

Lower grooved ceramic member 21 is also bonded on a substantially similar curved bar 39 as can be seen in FIGS. 4, 5, 6 and 7.

Referring to FIG. 4, one may see that upper curved bar 36 and lower curved bar 39 are maintained in parallel planes and in spaced relationship with each other with end spacers or posts 40 and 41. Post 40 at the left, as an illustration, has an axial internally threaded hole for receiving the stem of a cap screw 42 for clamping top bar 36 to the spacer 40. It also has an axially threaded internal hole for receiving the stem of a round headed machine screw 43 which clamps the lower bar 39 to the spacer 40. A similar cap screw 44 and a round headed screw 45 clamp the upper bar 36 and lower bar 39, respectively, to spacer 41 at the other end of the assembly. For the sake of thermal matching, spacers 40 and 41 are preferably molybdenum if the electrode plates are comprised of tungsten or tantalum and the curved support bars for the ceramic members are stainless steel.

One may see particularly well in FIG. 3 that lower curved bar 39 has a plurality of edgewise notches or slots such as 50 in its rear edge. These slots are for holding down the assembly in the bottom of chamber 10 as will be explained later. Bottom bar 39 also has several integral tongues such as 51 extending from its front edge. These also participate in anchoring the assembly within chamber 10 with very close dimensional tolerances as will be explained later.

Referring now to FIG. 10, it will be noted that the rear edge of ceramic member 20 has a slotted strip 52 bonded to it with any suitable adhesive such as epoxy resin. There are deep slots such as 53 with shallower slots 54 intervening between every other one of them. The cross section of strip 52 may be seen to be L-shaped in FIG. 5 and in other figures. Fine wires such as 30 and 31 from alternate signal electrode plates pass upwardly through slots 53 and 54 for the purpose of imparting rigidity or stiffness to these fine wires, and to assure that they will not be bent during the process of connecting them and of fitting the cover 12 onto chamber 10. Strip 52 may be any insulating material of suitable dielectric strength. A desirable material is that which is obtainable under the Dupont trademark Delrin. It bonds effectively by means of epoxy resin to the ceramic member 20 which, in a preferred embodiment, is comprised of a special machineable glass-ceramic material as will be discussed more fully later.

FIG. 5 reveals that the riser portions of the fine lead wires such as 30 and 31, which are spot welded to the alternate signal electrode plates, are staggered. The manner in which all of these fine lead wires are connected to the multitude, actually 320 in this case, of feed-throughs for detected signal currents in chamber cover 11 will now be discussed. The connections internal to the detector chamber are made with flexible printed circuit strips such as the one shown in FIG. 9. Although this illustrative strip is not shown in section, it will be understood that it is preferably a laminated strip comprised of an insulating film, a copper foil on it, another insulating film, printed circuit conductors on it, another insulating film, a copper foil and finally another insulating layer. The copper foil layer is for shielding to obviate triboelectric effects by connecting it to the grounded cover 11 of the detector. When the orientation or attitude of the detector changes, as it does in operating tomographic apparatus, flexing of the insulated conductors could produce friction that could result in minute spurious noise signals being developed due to friction. These triboelectric effect signals are precluded by grounding the foil. Although minor, these signals can affect the accuracy of the photon intensity data.

A plan view of a flexible printed circuit strip 59 of the type used for making electric connections inside of the detector chamber is shown in FIG. 9. The strip has several printed circuit conductors such as those marked 60 and 61. A typical printed conductor 61 terminates at opposite ends in solder eyelets, or holes, 62 and 63. There are a group of eight eyelets at one end 64 of the strip, and the one marked 63 is in this group. The members of the group which includes eyelet 62 are more widely spaced as will be noted. There is also an eyelet 65 to which a wire 66 is shown connected. Wires such as 66 are used for connecting the copper shielding foils in each flexible printed circuit strip 59 to each other and to ground to drain spurious signals as was explained above. In FIG. 3, several of the flexible connector strips 59 are shown connected as they would be before the assembly of this figure is inserted in chamber 10. The strips would extend over the area between the phantom lines 57 and 58. The eight solder holes 63 of the strips 59 are pressed onto groups of corresponding numbers of signal electrode connecting wires 30 and 31, and solder is applied around holes 63 and the wire tips. Subsequently, a long, convex insulating strip 67, see FIGS. 6 or 7, is glued over all of the wire tips. After flexible printed circuit strips 59 are connected to the signal electrodes by soldering and after common wire 27 is connected to the plurality of bias electrodes by spot welding, the assembly shown in FIGS. 3 and 4 is ready for installation in chamber 10.

FIG. 6 has the assembly which is shown in FIG. 3 installed in chamber 10. The curved lower metal bar 39, on which ceramic member 21 is bonded, rests on the bottom 68 of the curved channel 14 in chamber 10. There are a plurality of arcuate grooves 69 in the front wall 70 of the chamber. The tongues 51, which project from the front edge of lower curved bar 39, fit into these grooves. A fragmentary view of a tongue 51 and groove 69 is shown in FIG. 8. This construction assures that the front edges of the electrode plates will always be at a fixed distance from the internal front wall 70 of the chamber all along the length of the electrode plate array. Thus, the gap 71 will have a constant width along the length of the detector. The top surfaces 72 of the plurality of grooves 69 are slightly tapered to facilitate sliding the tongues into the grooves. After the tongues are inserted, metal bar 39 is anchored in its most frontward position with a plurality of socket headed machine screws, such as 73, which are inserted through the near notches 50 at the back edge of lower curved bar 39.

After the multicell electrode assembly is installed in chamber 10 as in FIG. 6, the cover 11 is supported adjacent the chamber 10 in a jig, not shown. The ends of the flexible printed circuit strips 59 having the holes 62 are then pressed onto the wire conductors 76 of the insulating feed-throughs 77 which are installed in leakproof fashion in corresponding holes in the cover 11. When all internal connections to feed-throughs are made, cover 11 is deposited on gasket 13 to close the chamber, and the detector assembly appears in section as in FIG. 7. The cover 11 is held down with a large number of socket headed cap screws such as the ones marked 12 in FIGS. 7 and 1.

As the cover 11, as in FIG. 6, is being brought toward chamber 10, the several flexible printed circuit connector strips 59 are folded into a serpentine configuration as shown in FIG. 7.

As may be seen in FIG. 7, the outer ends 78 of the conductors of the feed-throughs which connect, respectively, with the signal electrode plates extend upwardly from cover 11. External connections to a data acquisition system, not shown in FIG. 7, are made with flexible printed circuit strips such as those marked 79 and 80 in FIGS. 7 and 2. These strips are similar in construction to strips 59 in FIG. 9. Each of the strips 79 and 80 have eight printed circuit conductors in them which are connected to eight-pin connector blocks such as those marked 81 and 82. A typical connector block 82 has two rows of four connector pin sockets 83 which are shown in hidden lines in FIG. 7.

The external flexible strips 79 and 80 also have a layer comprised of copper foil, not visible, which serves as a shield and permits avoiding triboelectric effects. As can be seen in FIG. 2, a pair of wires 84 and 84' are connected in common to all such foils, and these wires are connected to the grounded cover 11 with screws 85 and 85'. The feed-through 86 and the shielded insulated conductor 87, which connects to feed-through 86 for supplying the high voltage to the common connected bias electrode plates of the electrode array, may also be seen in FIG. 2. The shield of conductor 87 is connected to the grounded cover 11 with a conductor 88. Cover 11, as can be seen in FIG. 2, is provided with holes such as the ones marked 90 at its corners for the purpose of mounting the detector assembly with bolts, not shown.

When the multicell detector is completely assembled as in FIG. 2, it is warmed and evacuated using the valve fitting 18 at one of its ends. After a high vacuum is obtained, valve 18 is coupled to a source of ionizing gas, not shown. The detector camber is then filled with ionizable gas and the valve is closed. As stated earlier, in an illustrative embodiment of the detector which is used for detecting X-ray photons up to the 120 kiloelectron volts energy range, xenon gas at 25 atmospheres is used.

Although it is not evident in the drawings, the bottom 68 of the chamber 10 interior that is, the bottom of curved channel 14 is provided with suitable recesses at its opposite ends for the round heads 43 and 45, see FIG. 4, of the assembly to fit in so that the bottom of lower bar 39 can rest flatly on bottom 68 in the chamber.

FIG. 2 also shows the electric circuitry schematically. The high voltage source is marked 94. It supplies the high voltage to the commonly connected bias electrodes through insulated conductor 87 which passes through feed-through 86. Typically, a stable 500 volts positive is applied to the bias electrodes in a multicell detector of the type herein described which is used for computerized axial tomography. The data acquisition unit is marked 95 in FIG. 2. It acquires the individual signals from the signal electrode plates in the detector. Only one wire 96 is shown as being connected to one of the pins in a connector block 81 which would be the connection to one of the signal electrode plates in the detector. As symbolized by the large number of conductors 97, similar to 96, there would be one such conductor running to each signal electrode plate in the multicell detector array.

A feature of the detector is the preferable use of a ceramic material into which grooves for holding the upper and lower edges of the electrode plates may be machined and which requires no firing. In a practical embodiment, the ceramic members 20 and 21 are made of Macor, which is the trademark designation of Corning Glass Works for its machineable glassceramic. This material is desirable because it can be accurately machined with standard metalworking tools an equipment, and firing is not required after machining to achieve dimensional stability. Its structure makes it difficult for cracks to propagate. It is characterized by high thermal stability, low porosity, good dielectric strength and a high thermal expansion coefficient which is closer to the coefficients of metals than most gas-free insulating materials. Other stable insulating materials can be used for the members 20 and 21 such as, but not limited to, nylon, ABS resin and polycarbonate resins. A usable polycarbonate resin is one sold under the General Electric Company trademark, Lexan. ABS resins comprise terpolymers of acrylonitrile, butadiene and styrene.

Mention was made earlier of the good thermal matching that is obtained in the detector assembly described herein. Avoiding thermal distortion, as has been achieved herein, is important since such distortion could change the distance between electrode plates and change the shape of the detector cells so they would produce inconsistent X-ray photon intensity data. In accordance with the invention, thermal matching is obtained by using tungsten or tantalum electrode plates between the ceramic members 20 and 21 and using type 416 stainless steel for the upper and lower bars 36 and 39 on which the ceramic members 20 and 21 are bonded. The spacers 40 and 41 are made of molybdenum to assist in obtaining thermal matching.

The ceramic members 20 and 21 are not made as single pieces in one actual embodiment. Each of the membes is comprised of threee curved segments which are placed endwise of each other and bonded with epoxy resin to metal supporting bars 36 and 39. All segments are of equal length and are interchangeable. Use of segments provides for a small gap between them which can be adjusted to allow for perfect alignment between the grooves in the upper and lower ceramic members when they are being aligned, prior to their bonding material having been set, in a jig, not shown.

Another important feature of the design is the establishment of a uniform distance and gap 71 between the front edges of the electrode plates and the inner wall surface 70 of chamber 10, as mentioned in connection with the description of FIG. 6. The tongues 51, abutting against the faces of grooves 69, help achieve this purpose so that the gap 71 is uniform in thickness. If there are variations between the front edges of the electrode plates and inner surface 70, the path traversed by incoming photons on their way to the spaces between the electrodes, or in the cells, would vary. This means, in effect, that even with uniform photon intensities being applied to the cells through the window 17, that their output signals would have different magnitudes because an indeterminate number of photoelectron-ion pair signals would be created in an irregular gas gap 71 where they are not collected as usable signals. It is further a feature of this invention and a requirement in order to achieve uniform cell response to radiation, that the cell plates be accurately positioned with respect to the accurately machined leading edge of the ceramic segments which are, in turn, accurately positioned with respect to the metal bars on which tongues 51 are situated. This design permits achievement of the required accuracy through the use of high recision assembly fixturing.

In the illustrative embodiment that is described herein, the ceramic members 20 and 21 which support the cell defining juxtaposed electrode plates are curved in their planes. The grooves in the membes for the upper and lower edges of the electrodes diverge from front to rear and actually lie on radii emanating from the center of an arc, which center would be essentially coincident with the focal spot of the X-ray tube, not shown, which orbits about the patient being examined jointly with the detector. Those skilled in the art will understand, however, that the grooves in the ceramic members and, hence, the electrode plates, could be in true parallelism for other uses of the detector in computerized axial tomography systems, for example, where a fan-shaped beam is not used. The construction principles of the new multicell detector might also be used in detectors for low energy electromagnetic radiation in which case a thinner non-metallic window might be substituted for the aluminum window 17 used herein.

Although a preferred embodiment of the invention has been described in considerable detail, such description is intended to be illustrative rather than limiting, for the principles disclosed herein may be variously embodied and the invention is to be limited only by interpretation of the claims which follow.

We claim:
1. A multicell radiation detector comprising:
   a chamber for gas that produces electron-ion pairs incidental to absorbing radiation,
   first and second insulating members and means for supporting said members in precise spaced apart relationship within said chamber,
   said first and second insulating members each having a side in which there is a plurality of grooves, said members being supported for their grooved sides to face each other,
   a plurality of electrode plate means secured in juxtaposed spaced apart relationship by having their opposed edges engaged in corresponding grooves in said members, respectively, the spaces between said plate means constituting cells for being occupied by said gas, and
   means for establishing electric circuits from said plate means to the exterior of said chamber.

2. The detector as in claim 1 wherein said insulating members are comprised of a material selected from the group of ceramic, nylon, polycarbonate resin and ABS resin.

3. The detector as in claim 1 wherein said insulating members are comprised of machineable glass-ceramic.

4. The detector as in claim 3 wherein said grooves are milled in said glass-ceramic members.

5. The detector as in claim 1 including a quantity of solidifying material in said grooves and extending a minor distance along said plate means.

6. The detector as in claim 1 wherein said grooves in said members are disposed along radii emanating from a common center at the outside of said chamber.

7. The detector as in claim 1 wherein:
said means for supporting said insulating members comprise a pair of metal bars to which said members are bonded, respectively, on their sides opposite of their respective grooved sides, said bar membes extending beyond opposite ends of said insulating members,
a spacer means between corresponding ends of said bar members and means for clamping said bar members and spacers together for said spacers to define an accurate distance between corresponding grooves in the respective insulating members,
said electrode plate means being comprised of high atomic number metal and said insulating members being comprised of machineable glass-ceramic, said bar members of stainless steel and said spacers of molybdenum.

8. The detector as in claim 7 including a quantity of solidifying adhesive material in said grooves and extending a minor distance adjacent the edges of said plate means for suppressing vibration by said plate means and for further securing said plate means to thereby reduce microphonics.

9. A multicell X-radiation detector comprising:
a chamber for confining a gas that produces electron-ion pairs incidental to absorbing radiation,
said chamber having bottom and side walls, one of said walls having a window for admitting radiation to said chamber,
a detector assembly for being mounted in said chamber, said assembly comprising:
first and second bar members for being disposed in said chamber in spaced apart relationship,
means for securing said bar members in spaced apart relationship,
first and second insulating members fastened to said bar members, respectively, said insulating members each having a side in which there is a plurality of grooves, said grooved sides being faced toward each other,
a plurality of electrode plates secured in juxtaposed spaced apart relationship by having one pair of opposed edges engaged in corresponding grooves in said insulating members, respectively, said plates also having front edges, the spaces between said plates constituting cells for being occupied by said gas,
means for supporting said assembly in said chamber for said front edges of said plates to be at a uniform distance from said window so the layer of gas between said window and said front edges is uniform,
a cover for sealingly closing said chamber, and
means for establishing electric circuits from said plates to the exterior of said chamber.

10. The detector as in claim 9 wherein said insulating members are comprised of machineable glass-ceramic.

11. The detector as in claim 9 wherein one of said bar members has a plurality of tongue means projecting from a side thereof which is adjacent said wall which has said window, said bar window being constructed and arranged for being supported on said bottom of the channel, said wall having said window also having a plurality of recesses therein into which said tongue means project for determining the size of the gas-filled space between said front edges of said electrode plates and said wall having said window.

12. The detector as in claim 11 wherein said one bar member has a plurality of screw receiving slots in a side thereof opposite of said tongue means to enable securing bar member to said bottom of said channel with screw means when said tongue means are in said recesses.

13. The detector as in claim 9 wherein said insulating members are fastened to said bar members with an adhesive material.

14. The detector as in claim 13 wherein said adhesive material is epoxy resin.

15. The detector as in claim 9 wherein said insulating members are comprised of a material selected from the group of nylon and polycarbonate resin.

16. The detector as in claim 9 wherein said insulating members are comprised of machineable glass-ceramic, said electrode plates are comprised of one of tungsten, tantalum and tungsten-tantalum alloys, said bar members are comprised of stainless steel, said means for securing said bar members in spaced relationship include spacer means between said bar members and comprised of molybdenum, said insulating members being fastened to said bar members with adhesive.

17. The detector as in claim 16 wherein said adhesive in epoxy resin.

18. The detector as in claim 9 wherein said insulating members are comprised of machineable glass-ceramic and are substantially coextensive in length with said bar members, at least one of said insulating members being wider than the bar fastened thereto to provide a surface on said insulating member adjacent and substantially coextensive in length with said insulating member, a strip of insulating material adhered to said surface, said insulating strip having a plurality of notches therein, wires connected respectively to electrode plates of one type, said wires passing through said notches for being supported therein.

19. The detector as in claim 18 wherein said insulating strip is comprised of Delrin.

20. The detector as in claim 18 wherein said electrode plates comprise an array of alternately arranged signal electrodes and bias electrodes, said wires which pass through said notches being connected to signal electrodes, another wire connected in common to all of said bias electrodes which are between said signal electrodes.

21. The detector as in claim 9 including a quantity of solidifying adhesive material in said grooves and extending a minor distance adjacent the edges of said plates which are in said grooves for suppressing vibration by said plates and further securing said plates to thereby reduce microphonics.

22. The detector as in claim 9 wherein said electrode plates are comprised of tungsten and are about 4 mils to 6 mils thick.

23. The detector as in claim 9 including a plurality of insulator feed-throughs including wire conductors extending from the inside to the outside of said chamber, other wires connected to respective electrode plates, and flexible printed circuit strips connecting the wires of said feed-throughs with said other wires, respectively.

24. The detector as in claim 23 wherein said printed circuit strips comprise an insulating film layer carrying conductive printed circuit foils, an insulating film layer carrying a conductive electric shield foil and insulating film layers disposed between said foils, means for connecting all of said shield foils to said chamber to thereby reduce triboelectric effects.

25. The detector as in claim 10 wherein said grooves are milled in said glass-ceramic members.

26. The detector as in claim 9 wherein said grooves in said insulating members are disposed along radii emanating from a cannon center at the outside of said chamber.

27. The detector as in claim 26 wherein each of said insulating members comprises a plurality of identical and interchangeable curved segments disposed circumferentially adjacent each other to form substantially continuous curved insulating members.

28. The detector as in claim 27 wherein the curvature of said segments is substantially coincident with a circle generated about said common center.

29. The detector as in claim 27 wherein said segments are comprised of machineable glass-ceramic and are adhered to said bar members, respectively, and said grooves are milled in said segments.

30. The detector as in claim 27 including epoxy resin for adhering said segments.

* * * * *

Disclaimer 4,119,853.—*Peter Stephen Shelley,* Brookfield; *William Darrell Love* and *Barry Newell Stone,* Waukesha, Wis. MULTICELL X-RAY DETECTOR. Patent dated Oct. 10, 1978. Disclaimer filed Apr. 24, 1981, by the assignee, *General Electric Co.*

Hereby enters this disclaimer to claims 1, 2, 6, 9, 15 and 26 of said patent.
[*Official Gazette June 23, 1981.*]